Patented Mar. 9, 1954

2,671,732

UNITED STATES PATENT OFFICE 2,671,732

MAGNESITE-CHROME REFRACTORIES

Raymond E. Birch and Clyde L. Thompson, Pittsburgh, Pa., assignors to Harbison-Walker Refractories Company, Pittsburgh, Pa., a corporation of Pennsylvania No Drawing. Application February 11, 1950, Serial No. 143,817

17 Claims. (Cl. 106—59)

This invention relates to magnesite-chrome refractories.

The basic refractory field was dominated for many years by magnesite refractories. Later, chrome ore entered the picture, and within recent years the basic refractories field has been advanced materially through the development of specially prepared refractories comprising blends of chrome ore and magnesite which in various respects are superior to refractories made from either of those materials without the other. Thus, refractories of the latter type are of improved resistance to thermal shock and withstand loading to much higher temperatures than do the simple magnesite or chrome ore refractories. In consequence, whereas previous to those developments the use of basic refractories was confined largely to furnace hearths, the side walls and roofs of furnaces operated at very high temperatures are now in many instances built from certain kinds of refractories containing both magnesite and chrome ore. As a result, open hearth steel furnaces now profitably utilize three to four times the tonnage of basic refractories per ton of steel that was used in 1933, prior to those developments. Another important factor is that although brick of chrome ore or magnesite alone have a high burning shrinkage, this is not the case with blends of the two materials because during their burning reactions occur that neutralize, at least to a large extent, the shrinking tendencies of the raw materials. Consequently, it has been possible to exploit unburned refractories which are shipped without burning and are matured in service. The ability to eliminate burning before placing bricks in service reduces the cost of manufacture and is therefore desirable as an economic factor.

In view of these developments the A. S. T. M. classifies basic bricks as follows:

A, chrome brick
B, chrome-magnesite brick
C, magnesite-chrome brick
D, magnesite brick The term chrome-magnesite brick is understood in the trade to designate only those brick made from chrome ore and magnesite in which the chrome ore predominates over the magnesite. Similarly, the term magnesite-chrome brick is applied only to those in which the magnesite is in excess of the chrome ore, and it is to this type that the present invention is directed, and the term is to be so understood in the following specification.

The word "burned" as used herein refers to the firing, or burning, of refractory brick and other shapes prior to shipment and being placed in service. Likewise, the word "unburned" is used to designate refractory shapes that are made with a temporary bond (chemically bonded brick) to render them strong enough to be shipped and erected without burning, the burning of the shapes then being accomplished in service in the furnace structure.

It has been characteristic of both types of brick made from chrome ore and magnesite that although they possess various desirable characteristics, nevertheless in those types of service in which they are exposed to repeated reversal of temperature or of atmosphere, they undergo progressive deterioration. For instance, under some service conditions the brick may be alternately brought to an elevated temperature and then to a lower temperature, or they may be alternately exposed at relatively short intervals of time to oxidizing gases and then to less oxidizing or actually reducing gases. As made prior to this invention both types of magnesite and chrome ore bricks when exposed to such conditions of use, as in certain parts of open hearth furnaces and glass tanks, undergo a continuous growth and soon tend to disintegrate.

Unburned chrome-magnesite brick, for instance containing from 15 to 25 per cent of magnesite, nevertheless find extensive use in the basic open hearth furnace. An example of such brick is that disclosed and claimed in Patent No. 2,053,146 to Harvey and McDowell. For some uses burned brick of this type perhaps excel, except for the drawback just mentioned, all other types of basic refractories used in this country. Their composition is essentially the same as that of the unburned brick but in a majority of applications their performance over the latter justifies their greater cost. For instance, careful studies have shown that in the roofs of port arches in the basic open hearth furnace fewer burned chrome-magnesite brick require replacement following a campaign than is the case with the equivalent unburned brick. This superiority of the burned chrome-magnesite refractories is due to the fact that their bonding strength has been developed throughout by burning them prior to use. On the other hand, the chemical bonds used to give unburned brick the strength to withstand handling and shipment lose their bonding strength in large degree at intermediate temperatures and in consequence in a wall or roof made of such brick in a furnace whose inside temperature is high, say 2800° F., and whose outside wall temperature is relatively low, say 300° F., there will be a large intermediate zone in the brick in which there will be a temperature gradient of the order of 500° F. to 2000° F., which is the approximate range of weakness of the unburned brick.

Unburned magnesite-chrome brick are also used extensively, not only in the steel industry but also in the non-ferrous field, e. g., in copper smelting, and to some extent as linings for Portland cement kilns. In such services these brick are commonly recognized as providing more extended life than the equivalent brick in which chrome ore predominates (chrome-magnesite brick).

In view of the experience, particularly in the steel industry, that unburned brick excel in performance if the magnesite predominates over the chrome ore, and that the burned chrome-magnesite brick are superior to the unburned brick of the same type, it might be expected that the best service would be given by burned magnesite-chrome brick. That expectation has not been realized for actually such a burned magnesite-chrome refractory of general utility does not constitute a recognized commercial type. This is due to the fact that prior to this invention it has been impossible to manufacture it in a commercially usable form because all attempts heretofore to manufacture a highly refractory burned magnesite-chrome brick have resulted in brick that are so weak and friable that the losses due to breakage both in manufacture and in transportation to and handling at the site of intended use have been excessive. Of course, the first prerequisite of any refractory is that it must be strong enough to withstand handling without breakage to an excessive or uneconomical degree. Furthermore, even apart from breakage due to weakness this generic friability rendered the brick unable to withstand abrasion such as results from contact with furnace charge, and from gases carrying abrasive particles. And the magnesite-chrome bricks available heretofore were so weak after burning that even when supplied in unburned form they could not be used for large sprung arches; instead, they have required suspended arch construction. The nearest approach to a refractory of the type under discussion was one made from a high lime magnesite and which due to the resulting presence of a substantial proportion of calcium silicate as a major constituent had limited utility due to the characteristic properties of that silicate.

A primary object of this invention is to provide magnesite-chrome refractories that are resistant to deterioration when exposed alternately to changes in temperature or of atmosphere, or both.

A further object is to provide magnesite-chrome refractories that combine resistance to deterioration when exposed to the alternating conditions just named, together with high strength in the burned condition, which are sufficiently strong to permit their use in sprung arch construction, and which may be made from readily available materials using standard manufacturing practices.

Still another object is to provide magnesite-chrome refractories in accordance with the foregoing objects and which possess a modulus of rupture of at least 600 lbs. per square inch (p. s. i.).

Still another object is to provide magnesite-chrome refractories in accordance with the foregoing objects and which may be supplied in the burned or the unburned condition as well as for use in the preparation of monolithic furnace elements, and which in the burned condition may be handled and shipped without experiencing objectionable losses.

Yet another object is to provide refractory batches for the making of refractories in accordance with the foregoing objects.

A still further object is to provide a method of making magnesite-chrome refractories which may be shipped and used in the burned or the unburned condition, which as burned possesses a modulus of rupture of at least 600 p. s. i., and which in use are resistant to the action of repeated alternations of atmosphere, and which method is easily and readily practiced without material change in existing manufacturing practices.

Other objects will appear from the following specification.

We have discovered, and it is upon this that our invention is in large part predicated, that by the addition of at least 10 per cent of alumina to magnesite-chrome refractory batches the tendency of those refractories to undergo deterioration when exposed repeatedly to alternations of atmosphere is diminished, and that, unexpectedly, the burned strength is increased greatly; in fact the refractories will have a modulus of rupture of at least 600 p. s. i. In other words, our invention overcomes a drawback of both types of refractories made from magnesite and chrome ore. At the same time the invention wholly suppresses the one factor that has heretofore militated against the production and use of burned magnesite-chrome refractories, i. e., the magnesite-chrome refractories of this invention are of high strength in contrast to the extreme weakness of the previous magnesite-chrome brick after being burned.

Magnesites generally contain small amounts of alumina, of the order of 1 or 2 per cent, and chrome ore may, and usually does, contain relatively large amounts, of the order of 25 per cent. Curiously enough, refractories made from such magnesite and chrome ore do not have the properties that characterize brick made in accordance with our invention. The novel properties of high modulus of rupture, or strength, and resistance to deterioration under alternations in service conditions, are derived only by the conjoint use of magnesite and chrome ore, with the magnesite predominating over the chrome ore, and of added free alumina. Moreover, although the resistance to deterioration in use under repeated alternations of atmosphere may be developed with somewhat less than 10 per cent of added alumina, we find that the high strength that characterizes the invention is attained only by the use of at least 10 per cent of alumina, and preferably more than that amount, say 15 per cent.

From what has been said it will be understood that the word "added" as used herein with reference to alumina means the addition of free alumina to the batch as well as the presence in the refractories of the particularly stated amount of alumina over and above that which occurs naturally in the magnesite and in the chrome ore.

Whereas burned magnesite-chrome refractories made without the addition of alumina, or with less than 10 per cent of it, are weak, punky and virtually unshippable, the brick made in accordance with our invention are exceptionally strong and have an excellent ring. They are so resistant to abrasion that they may be used to line rotary cement kilns where the tumbling charge of clinker would have promptly eroded the magnesite-chrome brick known prior to our invention.

The resistance of our new refractories to the destructive effects which are encountered in regenerative furnaces and under similar conditions where the direction of firing, or the character of the atmosphere, or both, are reversed at brief intervals of time has been determined by a cyclic test devised to simulate service conditions. This involves heating the bricks at 2200° F. and passing through the furnace alternately for 15-minute intervals an oxidizing atmosphere (air) and then a reducing atmosphere consisting of, by volume, 12 per cent of carbon monoxide and 88 per cent of nitrogen. The later atmosphere is more highly reducing than would ordinarily be experienced in regenerators but through its use laboratory tests provide in a short time an action that might be obtained only after 6 to 18 months in actual service conditions. In these tests magnesite-chrome brick containing no added alumina or with less than 10 per cent of added alumina underwent either a continuous growth or became so crumbly as to necessitate termination of the test. In contrast, burned magnesite-chrome brick having the same ratio of magnesite to chrome ore but containing at least 10 per cent of alumina in accordance with this invention remained strong throughout the tests and proved to be superior under these conditions to the best basic refractories previously made from chrome ore and magnesite.

The batches, and refractories made from them, in accordance with this invention contain, by weight, at least about 20 per cent of chrome ore, and at least 10 per cent, and preferably more of added alumina. Magnesite constitutes substantially all of the remainder of the refractory material and it is always in excess of the chrome ore although, as will appear, the batches and refractories may contain small amounts of other materials that do not adversely affect the properties that characterize our new refractories. In the absence of such other materials our refractories thus comprise by weight, from about 50 to 70 per cent of magnesite, about 20 to 40 per cent of chrome ore, and from at least 10 to 35 per cent of added alumina; if other materials are present these percentages will of course be modified accordingly.

In the practice of the invention it is essential that at least part of the magnesite and the added alumina be subdivided sufficiently to permit the reactions to occur during firing that are responsible for the new and desirable properties. Desirably the alumina should substantially completely pass a 150-mesh screen, but for most purposes we prefer that it be substantially all minus 325-mesh. A substantial proportion of the magnesite should pass a 65-mesh screen although we find that in the normal grinding of magnesite to provide particles of 8-mesh top size there will be sufficient fine magnesite for the purposes of the invention.

In the preparation of our refractory batches, the grain sizing may be of the type known in the art as continuous, in which no grain sizes are intentionally omitted, but the unique results of this invention are not dependent upon that because gap grinds, in which intermediate sizes of particles are naturally absent or are intentionally omitted, may be used with equally good results. In other words, it has been established that the high burned strength and other desirable properties of the refractories of this invention are not dependent upon any differential grain sizing of the base constituents, magnesite and chrome ore. Either may be predominantly coarse, predominantly fine, or distributed in all grain sizes. Inhomogeneity of structure is, however, deliberately sought by having either or both the chrome ore and magnesite graded up to relatively coarse size, say 6 or 8 mesh, and the alumina in all cases predominantly or entirely of very fine grind. Some coarse alumina may be present but it is not essential to our invention.

The batch is prepared and formed in accordance with practice customary in the art. Most suitably there is added to it a temporary binder to supply strength prior to firing, and a variety of binders for this purpose are known and used in the art. If bricks and other shapes are to be made the pressing is desirably under high pressure, say of the order of 4000 p. s. i. to 10,000 p. s. i. For many purposes the brick or other shapes are burned at 2700° to about 3000° F. The actual burning temperature is such as to develop the high strength and other properties that characterize these new refractories. Thus in using magnesites of extreme purity higher burning temperatures will be required than will be the case with magnesites of relatively low purity.

The invention is applicable to dead burned, or sintered, magnesites of great variety although for the best results they should not contain a high content of lime. We now believe that the upper limit is about 5 per cent of CaO, and that magnesites containing substantially higher amounts of lime should be used only in minor percentages. The word "magnesite" is used herein to refer to refractory dead burned material produced by the high temperature firing of material yielding MgO wholly or preponderantly, such as magnesite rock or magnesium hydroxide, whether natural or synthetic.

The invention is applicable likewise to a wide variety of chrome ores. In fact, we believe that it is possible to utilize certain chrome ores which in the past have not found general use in the refractories art, such as those having a high content of iron oxide, an example being the Transvaal chrome ore which may contain 20 to 26 per cent of iron oxide, expressed as FeO. It is immaterial for the purposes of the invention whether the chrome ore be used in the crude state or be preliminarily calcined or sintered.

Likewise, it it immaterial whether or not the blended constituents of the batch be calcined before blending in the batch. For instance, previously calcined alumina may be calcined with all or part of either the magnesite or the chrome ore, or with both of them. If such precalcining is practiced it will be advantageous in the case of fine grinding to nodulize or briquette the materials before calcining.

The best results are to be had using pure grades of alumina, such as the well known Bayer process alumina, and it should be calcined before use. Natural ores or minerals consisting mostly of alumina, e. g., bauxite, may be used. Bauxite and the like, when used, should be pre-calcined although a small proportion, of the order of 2 or 3 per cent, may be in the raw condition to give plasticity to the batch. Aluminum hydrate is unsatisfactory because of its high calcining shrinkage. Likewise, clays and kaolins, whether crude or calcined, fail to produce the results that characterize the invention.

The invention may be understood further with reference to one of the various series of tests that have demonstrated its utility. In these tests there were used a magnesite and a chrome ore of the following analysis:

|  | Magnesite, percent | Chrome Ore, percent |
|---|---|---|
| Magnesia (MgO) | 87.9 | 17.5 |
| Silica (SiO$_2$) | 5.3 | 4.6 |
| Alumina (Al$_2$O$_3$) | 1.8 | 26.1 |
| Iron Oxide | 2.2 (Fe$_2$O$_3$) | 13.6 (FeO) |
| Chromic Oxide (Cr$_2$O$_3$) |  | 35.7 |
| Lime (CaO) | 2.7 | 1.0 |
| Ignition Loss | 0.4 | 1.7 |
|  | 100.3 | 100.2 |

In these tests there was used a blend of magnesite and chrome ore in a 57:43 ratio, by weight. The two constituents were ground separately in a dry pan following which they were screened through a 4-mesh screen and then separated into the fractions held on 10-mesh, 28-mesh, 65-mesh and passing 65-mesh. Thus there were sizes of $-4+10$, $-10+28$, $-29+65$, and minus 65-mesh. Additional minus 65-mesh fines were made by ball milling magnesite to extreme fineness to give a fraction of which 67 to 72 per cent was minus 150-mesh. Bayer process alumina was used that contained about 99 per cent of Al$_2$O$_3$; it was ball milled so that 98 per cent passed a 325-mesh screen.

The three constituents were then compounded in the proportions shown in the following table, with a final screen analysis of 19 to 24 per cent $-4+10$ mesh, 22 to 24 per cent $-10+28$ mesh, 15 to 16 per cent $-28+65$ mesh, and 38 to 40 per cent minus 65-mesh, which latter fraction naturally included the alumina.

The mixes were tempered with lignin waste liquor to give temporary strength before burning, and mix A additionally contained 2 per cent of ball clay to compensate for its poor pressing properties. In the other mixes the alumina acted to improve the pressing properties. Standard 9 x 4.5 x 2.5 inch brick were pressed at 4000 p. s. i. and burned to 2790° F. reached at a rate of 30° F./hr. and held 10 hours, bringing down standard cone 23.

The composition and the resultant properties appear in the following table:

|  | A | B | C | D |
|---|---|---|---|---|
| Mixes: |  |  |  |  |
|   Magnesite-Chrome blend in 57:43 ratio | 100% | 95% | 90% | 85%. |
|   Bayer Process Alumina | 0% | 5% | 10% | 15%. |
| Properties: |  |  |  |  |
|   Modulus of rupture,[1] p. s. i. | 430 | 550 | 780 | 1,180. |
|   Load Test, 25 p. s. i., Temperature of Failure | 2,870° F | 2,890° F | 2,900° F | 2,860° F. |
|   Cyclic Test, 400 cycles: |  |  |  |  |
|     Percent Linear Change | +1.5 | +1.4 | +0.9 | +0.8. |
|     Appearance after test | Weakened | Weakened | Strong | Strong. |

[1] A. S. T. M. standard test.

From these test data it will be seen that the brick without alumina and containing only 5 per cent of added alumina were very weak, and in fact the addition of that amount of alumina did not appreciably increase the cold strength. Basic brick having a modulus of rupture under about 500 p. s. i. are recognized as being of questionable shippability. Magnesite-chrome brick such as A and B would certainly not withstand common commercial treatment in shipment and handling. On the other hand, the brick with 10 per cent and 15 per cent of added alumina were surprisingly strong and the modulus of rupture of both was well within the commercial range and there would be no question of their shippability.

As the strength data for the cyclic test referred to above, show, the resistance to repeated alternations of atmosphere is not developed below 10 per cent of added alumina. Consequently, the addition of 5 per cent of alumina does not suffice for the purposes of our invention, which requires the addition of at least 10 per cent, and most suitably 15 per cent of alumina, and this has been substantiated by all other series of tests. It has been recognized in the trade also that the use of, say, 5 per cent of added alumina is productive of abnormally low modulus of rupture.

Examples illustrative of the use of bauxite as the source of alumina follow, the brick being made and tested as described above:

| Mixes | E | F | G | H |
|---|---|---|---|---|
| Magnesite ___percent__ | 56.0 | 54.0 | 50.7 | 47.5 |
| Chrome Ore ___do___ | 42.0 | 40.5 | 38.2 | 35.8 |
| Calc. bauxite [1] ___do___ |  | 5.5 | 11.1 | 16.7 |
| Ball clay ___do___ | 2.0 |  |  |  |
| Modulus of rupture ___p. s. i._ | 520 | 580 | 850 | 1,140 |
| Temp. Failure, 25 p. s. i. ___° F__ | 2,740 | 2,690 | 2,780 | 2,770 |

[1] Amounts specified supplied Al$_2$O$_3$ as follows: F, 5%; G, 10%; H, 15%.

Here again, as will be observed, the initial high strength, and sustained high strength, that characterize our invention were produced with 10 per cent or more, but not with less, of alumina.

Much higher modulus of rupture has been developed by other bricks according to the invention. For instance, bricks made from, by weight, 38 per cent of dead burned magnesite, 28.7 per cent of chrome ore, and 33.3 per cent of calcined bauxite (supplying 30 per cent of Al$_2$O$_3$) showed a modulus of rupture of 1780 p. s. i., and the temperature of failure was 2890° F.

Although the invention has been described with particular reference to refractory brick, or shapes, that are burned prior to being installed in furnace structures, its benefits are attainable in large part also with unburned refractories. Such unburned, or chemically bonded, brick may be given their temporary bond by the use of magnesium sulfate, resins, lignin liquor, bitumens, oxychloride cements, or other of the known agents. When such unburned shapes are installed in furnace structures they may mature throughout to give equivalence to our burned brick where they are used as a bridgewall, or as piers, or in other furnace parts which are completely exposed to high temperatures. In other instances only one surface of the brick will reach high temperature, as in a furnace roof; in such cases the high strength which characterizes preburned brick will develop only in the hotter zone of the brick but even here the benefits of the invention will be attained in large measure.

The invention is applicable equally to refractory batches that are used for the construction of monolithic furnace structures. Batches for this purpose may duplicate those described above or they may contain supplementary bonding agents, such as sodium silicate, such as are necessary in some uses of these castable or ramming mixes. Mixes C and D described above are particularly suited for these purposes since neither shrinks on burning and both expand slightly upon being heated to 2700° F.

In addition to the properties described above, it has been found that a further desirable characteristic is that of compatibility with refractory magnesium silicates such as the forsteritic refractories known to the trade. Addition of small amounts of forsterite, whether synthetic or supplied by olivine or dunites, may be desirable in some instances inasmuch as they do not adversely affect the properties of our refractories.

The reason why the addition of at least 10 per cent of alumina to magnesite-chrome refractories in which the magnesite exceeds the chrome causes these desirable results is not clear to us. Presumably some reaction or reactions occur but there is no proof of precisely what transpires upon burning. Inasmuch as the improved character of our refractories is probably due to firing reactions it may occasionally be desirable to include in the batch a mineralizer such as one chosen from the known mineralizing fluorides, borates and phosphates although we have not found this to be necessary.

Brick made in accordance with the invention may be laid up with steel sheets or encased in steel cases, as is common practice with other basic refractories. However, the reinforcing action of such plates or cases is much less needed with the strong brick of this invention than for the prior magnesite-chrome brick with which they are virtually essential. Metal casing may therefore be dispensed with in the use of the present brick, which may be laid up either dry or with a bonding mortar. Elimination of the steel casing or plates will in many cases be advantageous since upon oxidation the steel creates excessive expansion with resultant development of pressure that may be destructive to the brick.

Our new brick may be used for the construction of suspended arches but a particular measure of what the invention accomplishes is to be found from the fact that our new brick may be used for sprung arch construction, in consequence of its high strength. This is in contrast to prior magnesite-chrome brick which even though chemically bonded have been so weak after heating that they could not be used in sprung arches except, possibly, those of very short span.

According to the provisions of the patent statutes, we have explained the principle and mode of practicing our invention and have described what we now consider to represent its best embodiment. However, we desire to have it understood that, within the scope of the appended claims, the invention may be practiced otherwise than as specifically described.

We claim:

1. Basic unfused refractory brick in which dead burned magnesite is the preponderant element, a part of said magnesite being less than 65-mesh, and containing, by weight, at least about 20 to about 40 per cent of chrome ore, and at least 10 to about 35 per cent of calcined added alumina of which at least part is less than 150-mesh, and in the burned condition having a modulus of rupture greater than 600 pounds per square inch as measured by the standard A. S. T. M. test, and maintaining its strength after repeated reversals of atmosphere.

2. Fired basic refractory brick comprising, by weight, about 50 to 70 per cent of dead burned magnesite, a part of said magnesite being less than 65-mesh, at least about 20 per cent of chrome ore, and from at least 10 to 35 per cent of calcined added alumina of which at least part is less than 150-mesh, and the brick having a modulus of rupture greater than 600 pounds per square inch as measured by the standard A. S. T. M. test, and maintaining its strength after repeated reversals of atmohere.

3. Unfused basic refractory batch comprising, by weight, about 50 to 70 per cent of dead burned magnesite, about 20 to 40 per cent of chrome ore, and from at least 10 to 35 per cent of added alumina.

4. Unfused basic refractory brick formed from, by weight, about 50 to 70 per cent of dead burned magnesite, about 20 to 40 per cent of chrome ore, and from at least 10 to 35 per cent of added alumina.

5. Pre-burned brick according to claim 4.

6. Unburned brick according to claim 4.

7. That method which comprises preparing a basic refractory batch comprising, by weight, about 50 to 70 per cent of dead burned magnesite part of which is less than 65-mesh, about 20 to 40 per cent of chrome ore, and from at least 10 to 35 per cent of added calcined alumina of which at least part is less than 150-mesh, forming refractory shapes from said batch, and burning said shapes and thereby developing a modulus of rupture greater than 600 pounds per square inch as measured by the standard A. S. T. M. test.

8. A method according to claim 7, part of said magnesite being less than 150-mesh, and said alumina being preponderantly finer than 325-mesh.

9. That method which comprises preparing a basic refractory batch comprising, by weight, about 50 to 70 per cent of dead burned magnesite part of which is less than 65-mesh, about 20 to 40 per cent of chrome ore, and from more than 10 to 35 per cent of added calcined alumina preponderantly less than 325-mesh, forming refractory shapes from said batch, and burning said shapes and thereby developing a modulus of rupture greater than 600 pounds per square inch as measured by the standard A. S. T. M. test.

10. Basic refractory formed in unfused condition from dead burned magnesite, chrome ore and added alumina in which there is, by weight, at least about 20 per cent of chrome ore, at least 10 per cent of added alumina, and the magnesite is in excess of the chrome ore and also of the alumina, the refractory after burning having a modulus of rupture greater than 600 pounds per square inch as measured by the standard A. S. T. M. test, said added alumina being calcined bauxite.

11. Pressed and burned refractory brick containing, by weight, from about 20 to about 40 per cent of chrome ore, from 10 to about 35 per cent of calcined added alumina preponderantly less than 325-mesh size, and the remainder substantially all dead burned magnesite, the magnesite being present in an amount greater than the amount of chrome ore and greater than the amount of added alumina and a portion of it being less than 150-mesh size, and the brick in said burned condition having a modulus of rupture greater than 600 pounds per square inch as measured by the standard A. S. T. M. test, and maintaining its strength after repeated reversals of atmosphere.

12. Refractory according to claim 11, said added alumina being calcined bauxite.

13. An unfused refractory batch comprising dead burned magnesite, chrome ore and added alumina in which the magnesite is the preponderant material, and containing from at least 10 to 35 per cent by weight of added alumina, and the remainder substantially all chrome ore, the chrome ore constituting at least about 20 per cent by weight of the batch, said added alumina being in the form of calcined bauxite.

14. That method which comprises preparing a basic refractory batch comprising, by weight, dead burned magnesite as the preponderant element, about 20 to 40 per cent of chrome ore, and from at least 10 to 35 per cent of added calcined alumina, and the remainder substantially all dead burned magnesite in an amount in excess of the chrome ore, forming refractory shapes from said batch, and burning said shapes and thereby developing a modulus of rupture greater than 600 pounds per square inch as measured by the standard A. S. T. M. test.

15. Method according to claim 14, said calcined alumina being calcined bauxite.

16. Basic refractory formed in unfused condition from dead burned magnesite, chrome ore and added alumina in which there is, by weight, at least about 20 per cent to about 40 per cent of chrome ore, more than about 10 per cent to about 35 per cent of added alumina, and the remainder is substantially all magnesite which is in excess of the chrome ore, the refractory after burning having a modulus of rupture greater than 600 pounds per square inch as measured by the standard A. S. T. M. test.

17. Pressed and burned refractory brick according to claim 16.

RAYMOND E. BIRCH.
CLYDE L. THOMPSON.

References Cited in the file of this patent
FOREIGN PATENTS

| Number | Country | Date |
|---|---|---|
| 11,175 | Great Britain | 1907 |
| 683,465 | France | 1930 |
| 149,349 | Switzerland | 1931 |
| 587,827 | Germany | 1933 |
| 716,226 | Germany | 1942 |